United States Patent [19]
Furusho et al.

[11] 3,767,227
[45] Oct. 23, 1973

[54] SAFETY DEVICE ASSEMBLY FOR VEHICLE OCCUPANT

[75] Inventors: Hirosuke Furusho, Takarazuka-shi, Hyogo; Shigetaka Fukui, Mino-shi, Osaka, both of Japan

[73] Assignee: Daihatsu Kogyo Co., Ltd., Osaka, Japan

[22] Filed: Mar. 8, 1971

[21] Appl. No.: 122,017

[30] Foreign Application Priority Data
Mar. 24, 1970  Japan.............................. 45/25069
Mar. 31, 1970  Japan.............................. 45/27274

[52] U.S. Cl. .................. 280/150 AB, 137/38, 222/5
[51] Int. Cl. ............................................. B60r 21/08
[58] Field of Search ................ 280/150 AB; 9/316; 222/5; 137/38, 68, 70; 251/35, 44

[56] References Cited
UNITED STATES PATENTS

| 2,806,737 | 9/1957 | Maxwell ................... 280/150 AB X |
| 880,030 | 2/1908 | Leavitt .............................. 251/35 X |
| 2,649,311 | 8/1953 | Hetrick ........................ 280/150 AB |
| 3,197,234 | 7/1965 | Bertrand ...................... 280/150 AB |
| 3,428,022 | 2/1969 | Ledley .............................. 222/5 X |

*Primary Examiner*—Kenneth H. Betts
*Attorney*—Pierce, Scheffler & Parker

[57] ABSTRACT

The inflation of an inflatable safety bag -- for the protection of an occupant of a vehicle -- is triggered by a sensitivity operable means associated with the conventional valve means, which sensitively operable means is responsive to sudden deceleration of the vehicle.

8 Claims, 9 Drawing Figures

PATENTED OCT 23 1973

INVENTOR.
H. Furusho
S. Fukui
BY

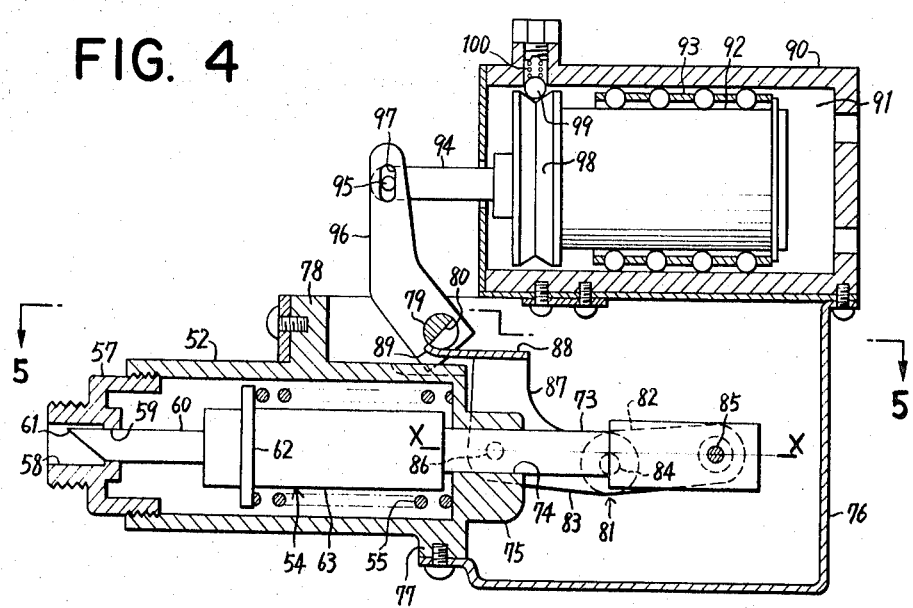
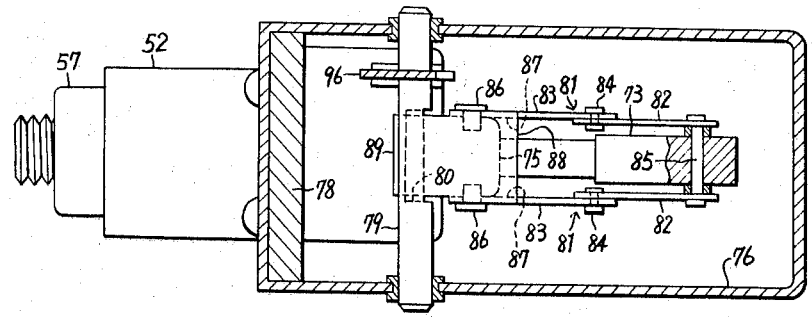
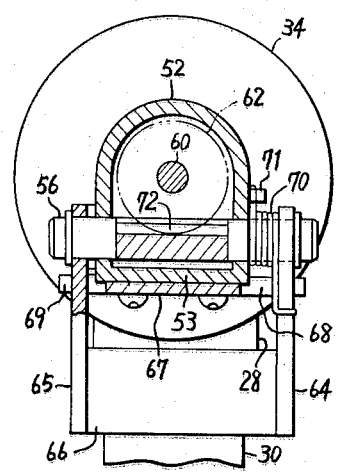

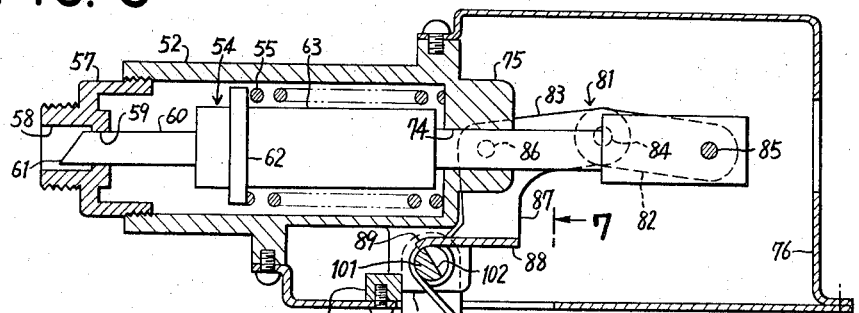
FIG. 6
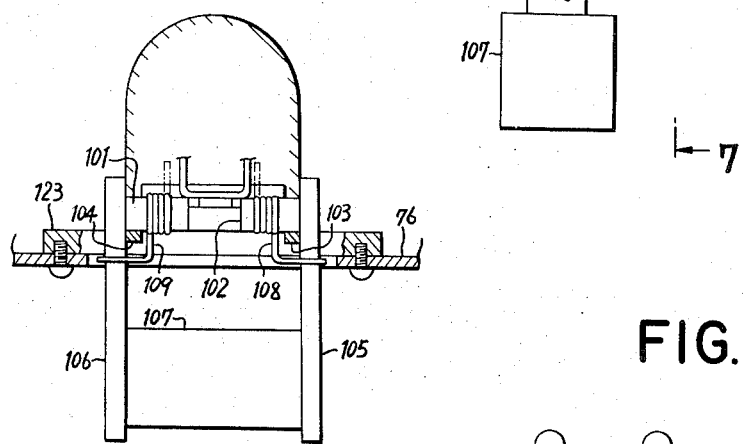
FIG. 7
FIG. 8
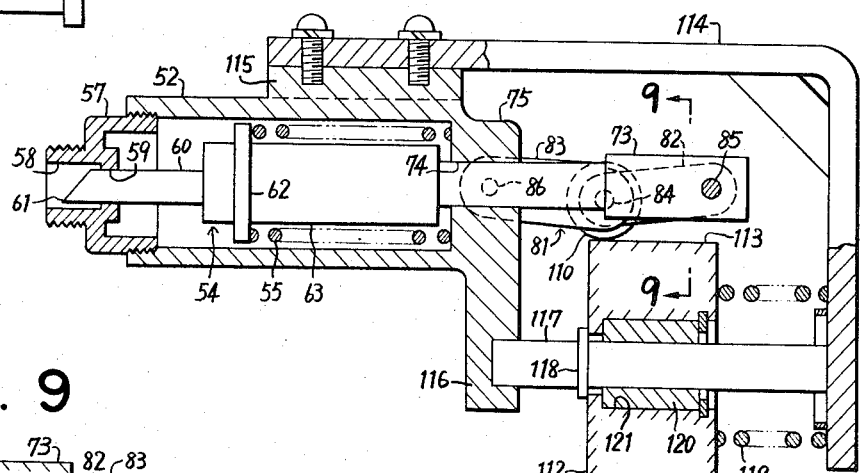
FIG. 9
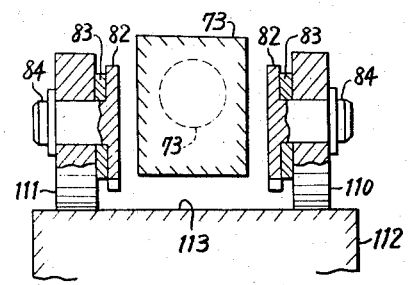

SAFETY DEVICE ASSEMBLY FOR VEHICLE OCCUPANT

This invention relates to safety device assemblies for the protection of occupants of vehicles and, more particularly, is concerned with an inflatable safety bag and a system for effecting appropriately rapid inflation thereof when a collision occurs.

A safety bag for protecting the occupant of a vehicle such as a passenger car or the like must appropriately inflat between the occupant and an inside part of the comparmtent, within the vehicle, occupied by the occupant. To be effective, it is very important that the safety bag be inflated extremely rapidly, and that operation of the apparatus for gas generation be rapid, when a collision occurs.

Accordingly, it is the principal object of the present invention to provide a safety device assembly for vehicle occupant which is quick and reliable in operation.

It is another object of the present invention to provide a safety device assembly in which a valve means provides the quick, reliable operation and includes a certain high pressure seal within a gas container.

It is still another object to provide a safety device assembly wherein a sensitivity operable means connected with the said valve means ensures quick and reliable operation of the safety device when a collision occurs.

A further object of the present invention is to provide a safety device assembly characterized by compact construction and small size.

Still another object of the present invention is to provide a safety device assembly which readily supplies the inflating gas within the gas container.

Other objects and advantages of the invention will become apparent from a consideration of the following description in conjunction with the accompanying drawing which sets forth the preferred embodiments of the invention and, wherein:

FIG. 3 is a cross-section view taken substantially along line 3 — 3 of FIG. 2 and showing the sensitivity operable means;

FIG. 4 is a longitudinal cross-section of another embodiment of the sensitivity operable means;

FIG. 5 is a sectional view taken on line 5—5 of FIG. 4;

FIG. 6 is a longitudinal cross-section of another embodiment of the sensitivity operable means;

FIG. 7 is a longitudinal view, partially in cross-section, taken in the direction of arrows 7 — 7 of FIG. 6;

FIG. 8 is a longitudinal cross-section of still another embodiment of the sensitivity operable means; and FIG. 9 is an enlarged fragmentary view taken along line 9 — 9 of FIG. 8.

Figure 1:
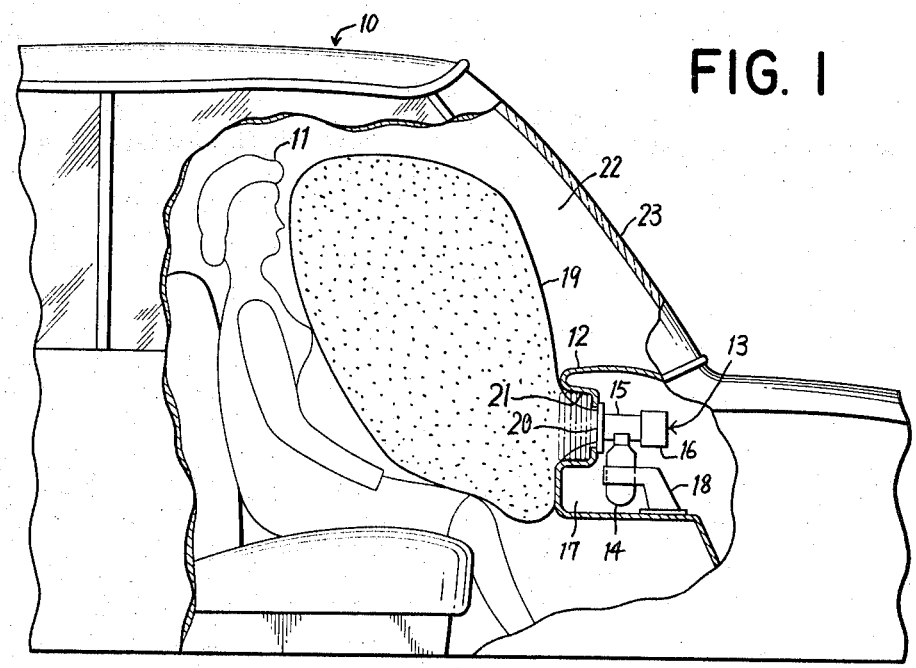
FIG. 1 is a partially broken away, fragmentary, view of the safety device assembly of the instant invention.

Referring to FIG. 1, there is shown therein a vehicle 10 with an occupant 11 seated before a dashboard 12. The safety device assembly 13 comprises a high pressure gas container 14 containing a gas, such as nitrogen gas or air, under high pressure; a valve assembly 15 connected with the gas container 14; and a sensitivity operable assembly 16 connected with the valve assembly 15. The safety device assembly 13 is provided in a compartment 17 within dashboard 12, and secured by a supporting bracket 18 attached on an inside surface of the dashboard 12. An open end of a safety bag 19 surrounds and is attached by adhesive or other conventional means to an open end of a flange 20 formed on the valve assembly. The safety bag 19 is formed of a suitable sheet-like material, such as cloth or plastic, and stowed in a depression 21 of the dashboard 12, during normal conditions, as shown by dotted line in FIG. 1. When a collision occurs, the sensitivity operable assembly 16 is subject to a sudden deceleration of the vehicle 10 and an initial actuation of the sensitivity operable assembly 16 is projected to the valve assembly 15. Thereupon, the valve assembly 15 supplies the safety bag 19 with the high pressure gas from the gas container 14, through itself. The safety bag 19 is inflated by a supply of the gas toward a compartment 22 between the occupant 11 and the inside parts, such as the dashboard 12 and/or windshield 23. The above-explained serial-operation is accomplished within an extremely short time period after a collision of the vehicle.

Figure 2:
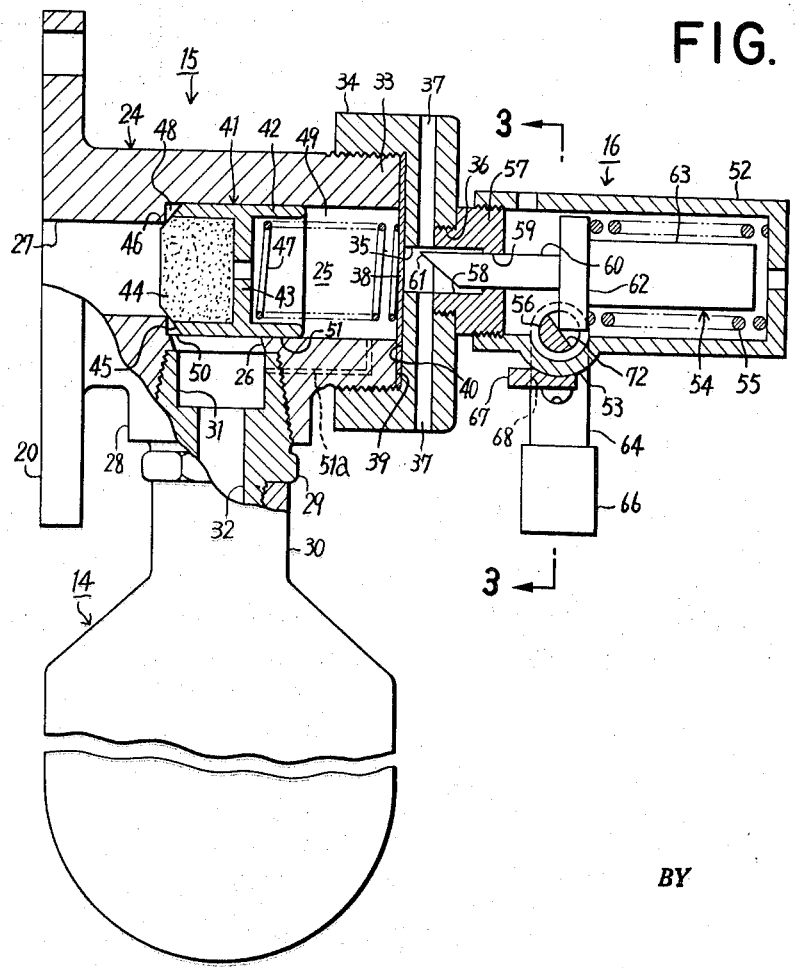
FIG. 2 is a longitudinal cross-section of the valve means and the sensitivity operable means.

Referring to FIG. 2 and FIG. 3, this embodiment shows a safety device assembly 13 which comprises a gas container 14, the valve assembly 15 and the sensitivity operable assembly 16. A relatively elongated valve body 24 includes a cylindrical valve chamber 25; an inlet port 26; an outlet port 27; and a laterally extended inlet projection 28. A threaded bushing 29 screwed into a neck portion 30 of the gas container 14 and into a threaded opening in the inlet projection 28 is provided to connect the gas container 14 with the valve body 24. The inlet port 26, passages 31, 32 are continuously formed in order to ensure smooth flow of the gas. A threaded end 33 of the valve body 24 is screwed into mating threads within a retaining cap 34 containing a port 35, a threaded port 36 and an outlet passage 37 therein for establishing communication between the port 35 and ambient atmosphere. A seal plate 38 is tightly clamped between an end surface 39 of the valve body 24 and an inner surface 40 of the retaining cap 34, and is made of a soft metallic material, such as aluminum, copper or the like.

A piston valve, generally designated at 41, is constructed of an annular member 42, a partition member 43 and a valve-closing element 44 made of a plastic or of a metallic material such as aluminum, copper or the like. Said element 44 is slidably inserted in valve chamber 25. It will also be seen that the piston valve 41 has an annular conical seat 45 which seats upon a valve seat 46 formed at the boundary between outlet port 27 and valve chamber 25,- particularly, the valve-closing element 44 seats upon.

A light helical compression spring 47 in the valve chamber 25 urges piston valve 41 into seat engagement with valve seat 46, but its force is negligible compared to the closing pressure force on the piston valve 41. Piston valve 41 in valve chamber 25 provides a front chamber 48, a rear chamber 49, which chambers 48, 49 communicate with inlet port 26 through passages 50, 51 respectively. Passage 50 is constructed of an annular conical seat 45 and an opening of inlet port 26, and offers a low flow-resistance. Passage 51 is constructed of an external surface of annular member 42 and an internal surface of the cylindrical valve chamber 25, not shown as visible clearance in FIG. 2, namely a slidable clearance of the piston valve 41, and has a high flow-resistance compared with the aforesaid flow-resistance. Said passage 51 may also be constructed of a passageway 51a shown in dotted line in FIG. 2.

Referring now to the sensitivity operable assembly 16, it is noted that its spring case 52 having a containing expansion 53 thereon includes a plunger assembly 54, a coil spring 55, a shaft 56, and a threaded bushing 57 in which a port 58 and a rod bore 59 are formed. Bushing 57 is screwed into threaded end portion of spring case 52 and into threaded port 36, whereby the sensitivity operable assembly 16 is attached to the valve assembly 15. The plunger assembly 54 includes a puncture rod 60 slidingly inserted into the rod bore 59, a sharp edge 61 in the port 35, a flange-shaped spring seat 62, and a rod member 63. This plunger assembly 54 is urged against seal plate 38 by a coil spring 55. Shaft 56 is transversely journalled in the lower portion of spring case 52, and carries two weight arms 64, 65 under which an inertia weight 66 is secured. A stop member 67 having stop surfaces 68, 69 is attached to an under portion of the containing expansion 53, and side surfaces of the weight arms 64, 65 are rotatably urged against the stop surfaces 68, 69 by torsion spring 70 relating to weight arm 64 and a projection 71 of the spring case.

An inclined restricting plane 72 which is formed on shaft 56,- for example, partially cutting off the shaft,- receives an edge of the spring seat 62, and is effective to accumulate the spring force of the coil spring 55 for output of this assembly 16. Further, the inclined restricting plane 72 keeps in suspension the seal plate 38. The distance between the seal plate 38 and sharp edge 61 is very slight.

In this condition, the inertia weight 66 hangs down and its weight arms 64, 65 maintain contact with stop surfaces 68, 69 by rotary force of the torsin spring 70. The differential pressured - areas formed at the ends of the piston valve provide a strong closing-force for gas sealing.

When a collision occurs, the inertia weight 66 responds to sudden deceleration of the vehicle 10 and rotates the shaft 56 having inclined restricting plane 72. The spring seat 62 is immediately permitted to slide on the inclined restricting plane 72 by the rotation of said plane, and the plunger assembly 54,- particularly, the sharp edge 61,- is rapidly projected toward the seal plate 38 by the accumulated spring force of the coil spring 55. When the seal plate 38 is broken by the projection of the sharp edge 61, the gas pressure within the rear chamber 49 behind the piston valve 41 is quickly released to atmosphere through the port 35 and the outlet passage 37, and the gas pressure within the front chamber 48 drives the piston valve 41 and the valve-closing element 44 therein away from the valve seat 46 to open the valve assembly 15. Accordingly, the passage from the gas container 14 to the safety bag 19 is constructed of the passage 31, 32, the inlet port 26, the front portion of the valve chamber 25 and outlet port 27, and the gas within the gas container 14 is quickly supplied to the safety bag 19 to inflate the same.

The above-explained operation of the present invention has an extremely fast response time after a collision. The constructions of the inertia weight means having a function to sense the sudden deceleration of the vehicle, the accumulated starting energy in the coil spring, the plunger assembly having the puncture means to break the seal plate, the differentially pressured piston valve means for closing and opening the gas passage, and the like cooperate to ensure the quick and reliable operation of the safety device assembly for the occupant of the vehicle. The valve assembly containing the differentially pressured piston valve is very convenient for charging the pressured gas, because the piston valve 41 automatically closes when the gas pressure in outlet port 27 and rear chamber 49 are equal.

With reference to FIGS. 4 and 5 wherein the sensitivity operable assembly 16 is shown, it will be seen that the arrangements of the spring case 52, the coil spring 55, and the plunger assembly 54 are identical with those shown in FIG. 2 except that a rear rod is connected to the rod 63 and a shaft. The plunger assembly 54, further, includes a rear rod 73 slidingly inserted into a bore 74 formed in an end portion 75 of spring case 52. A box-shaped link case 76 is attached to a projection 77, 78 formed on the spring case 52. The shaft 79 having a notched or cut-away portion 80 is rotatably journalled on the link case 76, extending transversely across the link case. An articulate link assembly 81 includes links 82, 83 and a pin 84 which articulately joins the said links. Both ends of the articulate link assembly 81 are pivotally articulated to an end portion of the rear rod 73 and to the end portion 75 of the spring case 52 by pivot pins 85, 86. The articulate link assembly 81 is disposed at both sides of the rear rod 73, as shown in FIG. 5. The link 83 having an upstanding member 87 includes an upper member 88 whereon there is formed a tongue member 89 in contact with an outside surface of shaft 79. The length and width of the tongue member 89 are so selected that the said member 89 may pass through the cut-away portion 80 when the shaft 79 rotates, as indicated in FIG. 5.

A weight case 90 having a cylindrical chamber 91 therein includes a column-shaped inertia weight 92 slidingly supported by bearing means 93 and attached to an upper portion of the link case 76. A rod 94 projected from the inertia weight 92 to the outside of the weight case 90 has a pin 95 at an end portion thereof. A lever 96 having an elongated aperture 97 at an end portion thereof is tightly attached to the shaft 79, and the pin 95 is inserted into the elongated aperture 97. A V-shaped groove 98 on the inertia weight 92 receives a steel ball 99 which is lightly urged by a coil spring 100 in order to prevent the movement of the inertia weight 92, except upon sudden deceleration of the vehicle at a collision.

During normal operation of the vehicle 10, the shaft 79 which is in contact with the tongue member 89 restricts the release of accumulated spring force in the coil spring 55. Namely, the accumulated force of the coil spring 55 is transmitted to the pin 85 through the plunger assembly 54, and then the link 83 with the tongue member 89 is rotatably urged in a clockwise direction. (as shown in FIG. 4), as the pin 84 is not located on a plane X — X including the pins 85, 86. In this way, the said restraint of the accumulated spring force is effectively accomplished and the sharp edge 61 is located in front of the seal plate 38.

When a collision occurs, the inertia weight 92 responds to sudden deceleration of the vehicle 10 and moves the rod 94 to the righthand direction (as shown in FIG. 4), and the lever 96 connected with the shaft 79 is simultaneously rotated. When the cut-away portion 80 rotates in a clockwise direction, the tongue member 89 passes therethrough, and the articulate link assembly 81 turns into the V-shaped form with the rotation of links 82 and 83. Accordingly, the plunger assembly 54,- particularly the sharp edge 61,- is rapidly projected — by the release of the accumulated spring force — against the seal plate 38, and the subsequent operation of the valve assembly 15 is identical with that explained in connection with FIG. 2.

In the above-explained operation, the constructions of the inertia weight means having a function to sense the sudden deceleration of the vehicle, the coil spring wherein there is the accumulated starting energy, the plunger assembly having the puncture means to break the seal plate and having the rear rod articulately related to the articulate link assembly, the articulate link assembly having the tongue member contacting with the shaft, the cut-away portion on the shaft whereby the tongue member can pass through, the movable connection, such as lever, rod between the inertia weight and the shaft, and the like effectively ensure quick and reliable operation of the safety device assembly for vehicle occupant.

With reference to FIGS. 6 and 7, wherein the sensitivity operable assembly 16 is described, it will be seen that the arrangements of spring case 52, coil spring 55, plunger assembly 54, and articulate link assembly 81 are identical with FIGS. 4 and 5, except that the said assembly 81 is inverted in up-and-down direction, and an inertia weight is swingingly provided, and the spring case 52 has projections supporting the shaft, and the like, as viewed in FIGS. 6, 7. The shaft 101 has a cut-away portion 102 at the middle thereof. The shaft is rotatably journalled on two projections 103, 104 which depend from spring case 52. The tongue member 89 contacts an outside surface of the shaft 101 to restrict the release of the coil spring 55 wherein the starting energy is accumulated. Two weight arms 105, 106 tightly carrying an inertia weight 107 are fixed to ends of the shaft 101, and are rotatably urged, by torsion springs 108, 109, against a stop member 123 fixed on an inside surface of the link case 76. Torsion springs 108, 109 are connected with the weight arms 105, 106 and the end portion 75 of the spring case. The width and length of the tongue member 89 are so selected that the said member 89 may pass through the cut-away portion 102 when the shaft 101 rotates, as described with reference to FIG. 7.

During normal operation of the vehicle 10 the torsion springs 108, 109 prevent movement of the inertia weight 107, and so the shaft 101 restricts the release of accumulated spring force. When a collision occurs, the inertia weight 107 responds to sudden deceleration of the vehicle 10 and rotates the shaft 101 in a counterclockwise direction, as shown in FIG. 6. The tongue member 89 is permitted to pass through the cut-away portion 102 by the rotation of the shaft, and then the accumulated starting energy of the coil spring 55 is released. The subsequent operation is identical with the said explanation in FIGS. 4 and 5.

The apparatus described in FIGS. 6 and 7 has a quick and reliable operation as safety device assembly for vehicle occupant, and the construction for obtaining the stated advantages is similar to that of the same embodiment in FIGS. 4 and 5.

With reference to FIGS. 8 and 9, wherein the sensitivity operable assembly 16 is described, it will be seen that the arrangements are generally identical with FIGS. 6 and 7 except for means to release the accumulated starting energy. The articulate link assembly 81 has rollers 110 and 111 on pin 84. The rollers 110, 111 are restricted from descending by an inertia weight 112 wherein a restricting surface 113 is formed. An L-shaped arm 114, which is attached to a seat 115 on the spring case 52, and a lug 116, which downwardly extends from spring case 52, are oppositely disposed so as to support a guide shaft 117 having a flange-shaped stopper 118. The guide shaft 117 slidingly penetrates inertia weight 112, and inertia weight 112 is urged against the stopper 118 by a coil spring 119. A sliding bearing 120 is inserted into a bore 121 in the inertia weight.

During normal operation of the vehicle 10, the accumulated starting energy in the coil spring 55 is suspended, because descent of the rollers 110, 111 is restricted by the restricting surface 113. When a collision occurs, inertia weight 112 responds to sudden deceleration of the vehicle 10, and it moves to the right with a compression of the coil spring 119. Accordingly, the rollers 110, 111 disconnect from the restricting surface 113, and the accumulated starting energy is quickly released. The subsequent operation is identical with the said explanation in FIGS. 4 and 5.

The apparatus described in FIGS. 8 and 9 provides quick and reliable operation as safety device assembly for vehicle occupant, and is similar to the said embodiment of FIGS. 4 and 5.

It is to be understood that the forms of the invention herein shown and described are to be taken as preferred examples thereof, and that various changes may be made in the shape, size and arrangement of certain parts without departing from the spirit of the invention or the scope of the attached claims, and each such change is contemplated.

We claim:

1. A safety device assembly for attachment to a vehicle for protecting an occupant thereof, said assembly comprising:
    an inflatable safety bag; a gas container means wherein gas is contained under high pressure;
    a valve means, containing therein a differential pressured piston valve, in communication with said safety bag and said gas container;
    a sensitivity operable means which is operatively connected to said valve means and contains an inertia weight means responsive to sudden deceleration of such vehicle during collison;
    a plunger assembly which is quickly projected toward said valve means; and
    a spring means wherein there is accumulated projecting energy for projecting said plunger assembly said inertia weight means releasing the accumulated projecting energy of said spring means for projecting said plunger assembly toward said valve means.

2. A safety device as defined in claim 1 wherein said spring means comprises a coil spring and said sensitivity operable means includes a spring case for said coil spring;
    a rear rod formed with said plunger assembly and slidingly supported by an end portion of said spring case;
    an articulate link assembly jointed to said end portion and an end portion of said rear rod;
    an upstanding member formed at a link of said articulate link assembly and having a tongue member;

a restricting means rotatably mounted on a stationary portion of said case, a cut-away portion being formed on said restricting means whereby said tongue member may pass through said cut-away portion upon rotation of said restricting means;

a cylindrical surface on said restricting means which maintains contact with said tongue member; , and a connecting means provided between said restricting means and said inertia weight means.

3. A safety device as defined in claim 1 wherein said spring means comprises a coil spring and said sensitivity operable means includes a spring case for said coil spring;

a rear rod formed with said plunger assembly and slidingly supported by an end portion of said spring case;

an articulate link assembly jointed to said end portion and an end portion of said rear rod;

a restricting surface formed upon said inertia weight means, a guide means supported on a stationary member for permitting sliding movement of said inertia weight means, and movement means provided at an articulating portion of said link assembly and being restricted in its descent by said restricting surface.

4. A safety device as defined in claim 1 wherein said plunger assembly has a sharp edge projectable against said valve means.

5. A safety device as defined in claim 1, wherein said spring means comprises a coil spring and said sensitivity operable means includes a spring case for said coil spring; and a restricting means which maintains contact with a part of said plunger assembly to restrict the release of said projecting energy; said inertia weight means being connected to said restricting means.

6. A safety device assembly as defined in claim 1, wherein said valve means comprises a valve body including a cylindrical valve chamber, said valve chamber having an inlet port, an outlet port and a valve seat between said inlet port and said outlet port;

a piston valve slidably inserted in said valve chamber and dividing the latter into a front chamber and a rear chamber;

an annular conical seat formed on said piston valve and seated upon said valve seat;

a low flow-resistance passage from said inlet port to said front chamber;

a second passage from said inlet port to said rear chamber said second passage having high flow-resistance in comparison with said low flow-resistance;

a passageway provided between said rear chamber and ambient atmosphere to release gas pressure in said rear chamber; and a breakable seal means tightly disposed in said passageway.

7. A valve means as defined in claim 6, wherein said breakable seal means comprises a metal selected from the group consisting of aluminum and copper.

8. A valve means as defined in claim 6, wherein said breakable seal comprises a sheet-like material.

* * * * *